United States Patent [19]

Chang et al.

[11] 4,104,230

[45] Aug. 1, 1978

[54] TWO-PACKAGE POLYMERIC COMPOSITIONS

[75] Inventors: Wen-Hsuan Chang, Gibsonia; Karl F. Schimmel, Verona; James A. Claar, Export, all of Pa.

[73] Assignee: PPG Industries, Inc., Pittsburgh, Pa.

[21] Appl. No.: 771,135

[22] Filed: Feb. 23, 1977

[51] Int. Cl.² .................. C08L 33/02; C08L 63/10
[52] U.S. Cl. .................. 260/29.6 NR; 260/836; 260/837 R; 428/463
[58] Field of Search ............ 260/29.6 NR, 836, 837 R

[56] References Cited

U.S. PATENT DOCUMENTS

| | | | |
|---|---|---|---|
| 3,494,847 | 2/1970 | Yurchesen et al. | 204/181 |
| 3,719,629 | 3/1973 | Martin et al. | 260/33.2 EP |
| 3,945,963 | 3/1976 | Levine et al. | 260/29.6 NR |

FOREIGN PATENT DOCUMENTS 1,293,529  10/1972  United Kingdom.

*Primary Examiner*—Stanford M. Levin
*Attorney, Agent, or Firm*—Charles R. Wilson; Frank J. Troy

[57] ABSTRACT

Two-package polymeric compositions which form cured products having excellent stain and solvent resistance and which can be water-reducible if desired comprise a polyepoxide and an addition interpolymer containing pendent salt groups, formed by reacting carboxyl groups with a base, and pendent amine groups formed by reacting carboxyl groups with an alkylenimine. The addition interpolymer preferably has a pH of greater than 7.0 in the presence of water, and when mixed with the polyepoxide reacts to form a cured, hard, solvent and stain-resistant material.

13 Claims, No Drawings

TWO-PACKAGE POLYMERIC COMPOSITIONS

BACKGROUND OF THE INVENTION

Certain water-thinnable coating compositions composed of acidified addition copolymers containing pendent carboxyl groups and pendent aminoester groups formed by aminoethylating pendent carboxyl groups with an excess of alkylenimine and epoxy resins are known, as shown by U.S. Pat. No. 3,719,629 to Martin et al., issued Mar. 6, 1973. These acidified copolymers are cationic acid salts, i.e., the salt groups are provided by reacting basic groups with an acid. This creates a number of serious disadvantages. For example, because of the cationic nature of the copolymer, it cannot be readily formulated into a coating composition by blending it with the conventional anionic modifiers normally employed in coating compositions, acid sensitive pigments such as the carbonates cannot readily be employed, and the conventional anionic pigment dispersants cannot be utilized in the usual manner. Another disadvantage, due to the fact that the copolymer product is an acid salt, is that it cannot be satisfactorily employed as a coating material for unprimed metal substrates since such acid salts usually cause flash rusting.

Water-based coating compositions containing basic salts of polycarboxylic acid resins containing amine groups formed by iminating a portion of the carboxyl groups are shown by U.S. Pat. No. 3,494,847, issued to Yurcheson et al. on Feb. 10, 1970. The coating compositions disclosed in U.S. Pat. No. 3,494,847 generally utilize as the polycarboxylic acid resin certain fatty acid adducts containing unsaturation for curing, but in some cases interpolymers of acrylic and other vinyl monomers, at least one of which contains a hydroxyl group, are contemplated. In such cases, the interpolymer is cured with an amine-aldehyde condensate to which may be added a polyepoxide.

U.S. Pat. No. 3,945,963, issued to Levine et al on March 23, 1976, described emulsions of acrylic interpolymers in combination with certain resins derived from epoxides. These resins are either very high molecular weight (above 20,000) or defunctionalized (and thus not a polyepoxide) by reaction of the epoxy groups, such high molecular weight or defunctionalization being necessary in order to provide the one-package compositions contemplated.

SUMMARY OF THE INVENTION

In accordance with this invention, two-package polymeric compositions are provided which, when interreacted, form crosslinked, hard, solvent-resistant and extremely stain-resistant materials. The film-forming components of these polymeric compositions consist essentially of a polyepoxide and an addition interpolymer containing a polymeric backbone of two or more ethylenically unsaturated monomers, at least one of which contains carboxyl groups, pendent amine groups formed by reacting part of the carboxyl groups with an alkylenimine, and pendent salt groups formed by reacting part of the carboxyl groups with a base. There may or may not remain unreacted carboxyl groups, but in any event the number of salt groups should be sufficient to provide the desired viscosity and solubility characteristics. Usually the composition is intended to be dissolved or dispersed in water, and in such water-reducible systems the addition interpolymer should be sufficiently neutralized so as to have a pH, in aqueous medium, greater than about 6 and preferably greater than 7. The stability of admixed compositions is enhanced by employing an alkali metal hydroxide or a sterically-hindered tertiary amine to form the salt groups of the addition interpolymer.

These compositions can be made to be water-reducible, if desired, and in the preferred embodiments of the invention either or both of the film-forming vehicle components are in a solvent medium composed predominantly of water. When a water-reducible composition is desired, any organic solvents present should be miscible (in the proportion present) with water.

The polymeric compositions of the invention form cured products having excellent stain and solvent resistance which are useful in various coating, casting and molding applications and which are particularly useful as protective and decorative coatings.

DETAILED DESCRIPTION OF THE INVENTION

A wide variety of polyepoxides may be utilized in the compositions of this invention, but in order to provide the cured products desired, the polyepoxide should have a 1,2-epoxy equivalence greater than 1.0, that is, in which the average number of 1,2-epoxy groups per molecule is greater than 1, and be of low molecular weight, i.e., below about 4000. The polyepoxide can be any of the well-known epoxides, such as, for example, those described in U.S. Pat. Nos. 2,467,171; 2,615,007; 2,716,123; 3,030,336; 3,053,855 and 3,075,999. A useful class of polyepoxides are the polyglycidyl ethers of polyphenols, such as Bisphenol A, produced, for example, by etherification of a polyphenol with epichlorohydrin or dichlorohydrin in the presence of an alkali. The phenolic compound may be bis(4-hydroxyphenol)-2,2-propane, 4,4'-dihydroxybenzophenone, bis(4-hydroxyphenyl)1,1-ethane, bis(4-hydroxyphenyl)1,1-isobutane; bis(4-hydroxy-tertiary-butylphenyl)2,2-propane, bis(2-hydroxynaphthyl)methane, 1,5-dihydroxy-naphthalene, or the like. Another quite useful class of polyepoxides are produced similarly from Novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis(4-hydroxycyclohexyl)-2,2-propane, and the like.

There can also be used polyglycidyl esters of polycarboxylic acids which are produced by the reaction of epichlorohydrin or a similar epoxy compound with an aliphatic or aromatic polycarboxylic acid, such as oxalic acid, succinic acid, gluratic acid, terephthalic acid, 2,6-naphthylene dicarboxylic acid, dimerized linolenic acid and the like. Examples are diglycidyl adipate and diglycidyl phthalate.

In addition, polyepoxides derived from the epoxidation of an olefinically unsaturated alicyclic compound may also be employed. Included are diepoxides comprising in part one or more monoepoxides. These polyepoxides are non-phenolic and are obtained by epoxidation of alicyclic olefins, for example, by oxygen and selected metal catalysts, by perbenzoic acid, by acetaldehyde monoperacetate, or by peracetic acid. Among such polyepoxides are epoxyalicyclic ethers and esters, which are well known in the art.

Another class of polyepoxides which may be employed are those containing oxyalkylene groups in the epoxy molecule. Polyepoxides containing oxyalkylene groups can be produced by reacting some of the epoxy groups of a polyepoxide, such as the polyepoxides mentioned above, with a monohydric alcohol containing oxyalkylene groups.

Other epoxy-containing compounds and resins which may be employed include nitrogeneous diepoxides such as disclosed in U.S. Pat. No. 3,365,471; epoxy resins from 1,1-methylene bis(5-substituted hydantoin), U.S. Pat. No. 3,391,097; bis-imide containing diepoxides, U.S. Pat. No. 3,450,711; heteocyclic N,N'-diglycidyl compounds, U.S. Pat. No. 3,503,979; amino epoxyphosphonates, British Pat. No. 1,172,916; 1,3,5-triglycidyl isocyanurates, and the like.

In some instances, chain-extended polyepoxide adducts may be employed to impart a desired property to films formed from the compositions of the invention, such as, for example, flexibility. Such adducts can be prepared by reacting a polyepoxide, such as, for instance, the polyglycidyl ethers of polyphenols described above, with an organic polyol having at least two alcoholic primary hydroxyls at temperatures of from about 120° to about 200° C. in the presence of a suitable catalyst. Various organic polyols may be utilized in the chain-extension reactions. An especially useful class of organic polyols are the various polyethylene glycols marketed under the designation Carbowax. Other organic polyols which may be utilized include low molecular weight diols, triols and higher polymeric polyols such as polyester polyols, polyester polyols and the like. Of these, the polyester polyols, particularly the polycaprolactone polyols, such as those described in U.S. Pat. No. 3,169,945 to Hostettler, are especially useful.

It should be noted that while such chain-extended polyepoxide adducts can impart desirable properties to films formed from the compositions herein, they may also adversely affect other properties such as stain resistance. Accordingly, in applications where extremely high levels of stain resistance are required, only minor amounts of such chain-extended polyepoxide adducts should be utilized. In such cases, it is preferred to limit the amount of such adducts to 40 percent by weight or less of the total polyepoxide component employed in the polymeric composition.

The amounts of polyepoxide included in the compositions of the invention should be sufficient to provide a crosslinked product upon inter-reaction with the addition polymer but may vary considerably, depending upon desired properties. Usually from about 5 to about 95 percent by weight of the epoxy resin, based upon the combined weight solids of the addition copolymer and epoxy resin may be employed, with a preferred amount being from about 25 to about 75 percent by weight.

As indicated above, the other essential component of the water-reducible polymeric compositions of the invention is an addition interpolymer containing carboxyl groups, at least part of which are reacted with an alkylenimine and part with another base, as discussed herein. The addition interpolymer component is generally prepared by reacting an addition interpolymer containing carboxyl groups with an alkylenimine in sufficient amount to iminate a portion of the carboxyl groups and then with a base to neutralize at least a portion of the remaining carboxyl groups. The order of reaction is not usually critical.

The term "iminate" as employed toroughout this specification means to react an imine (i.e., an alkylenimine or substituted alkylenimine) with a carboxyl group. Thus, an iminated interpolymer refers to an interpolymer in which the carboxyl groups thereof have been reacted or partially reacted with an imine.

The addition interpolymer containing carboxyl groups is prepared by interpolymerizing at least one polymerizable ethylenically unsaturated carboxylic acid monomer with one or more other polymerizable ethylenically unsaturated monomers utilizing conventional vinyl addition solution polymerization techniques and procedures. Thus, the monomer mixture is ordinarily polymerized in a solvent medium and in the presence of a suitable catalyst, usually under controlled elevated temperatures with agitation until the polymerization reaction is complete. Various modifications commonly practiced in solution polymerization reactions, such as stepwise addition of the monomer mixture during polymerization, incremental addition of catalyst, polymerization under an inert atmosphere, continuous or batch polymerization and the like may be employed.

Ethylenically unsaturated carboxylic acids which may be employed in forming the interpolymer include alpha, beta-ethylenically unsaturated monocarboxylic acids such as acrylic acid, methacrylic acid, cinnamic acid, and the like; unsaturated dicarboxylic acids such as maleic acid, fumaric acid, itaconic acid and the like; and half esters of unsaturated dicarboxylic acids such as t-butyl hydrogen maleate, isopropyl hydrogen fumarate and the like. It should be noted that when acids are referred to above, the anhydrides of such acids, where they exist, may also be utilized. In addition, mixtures of the foregoing acids (or anhydrides) may be employed. The preferred ethylenically unsaturated carboxylic acids herein are the alpha, beta-ethylenically unsaturated monocarboxylic acids and of these acrylic and methacrylic acids are especially preferred.

The unsaturated carboxylic acid monomer comprises usually from about 5 to about 60, preferably from 10 to 50, percent by weight of the addition interpolymer.

The other monomer or monomers which may be employed in forming the interpolymer include essentially any copolymerizable monomer. Examples are esters of unsaturated acids such as those mentioned above, especially alkyl acrylates and methacrylates; unsaturated esters of organic and inorganic acids, such as vinyl halides, vinylidene halides, vinyl acetate, dialkyl maleates, allyl chloride and the like; monoolefinic and diolefinic hydrocarbons such as styrene, alpha-methyl styrene, the halo-substituted styrenes, vinyl toluene, vinyl naphthalene, allyl alcohol, 1,3-butadiene, 2-chlorobutene, isoprene and the like; unsaturated amides (unsubstituted or substituted) such as acrylamide, methacrylamide, diacetone acrylamide, crotonamide, N-(methoxymethyl)acrylamide, N-(propoxymethyl)acrylamide, N-(butoxymethyl)acrylamide, N-(butoxymethyl)methacrylamide, N-methylol acrylamide and the like; and unsaturated nitriles such as acrylonitrile, methacrylonitrile and the like. The specific monomers chosen and their proportions will depend upon the properties desired and their reactivity with each other and the acid monomer, using considerations well known in the art.

As is more fully described in copending application Ser. No. 771,134, filed on even date herewith, for some purposes it is preferred that the other monomers be entirely or at least predominantly aminolysis resistant monomers such as vinyl aromatic monomers and sterically-hindered, branched chain and alicyclic ester monomers.

If desired, virtually any of the organic solvents heretofore employed in preparing acrylic interpolymers of this may be utilized as the solvent medium in preparing the addition interpolymer. Thus, alcohols such as propanol, butanol, or other lower alkanols; ketones such as methyl ethyl ketone, methyl n-butyl ketone, and the like; and aromatic hydrocarbons such as xylene, toluene and the like as well as mixtures of such solvents may be employed. When, as in the preferred embodiments, the ultimate interpolymer product is intended to be dissolved in or thinned with water, it is preferred to employ water-soluble or water-miscible organic solvents as the solvent medium in the polymerization reaction. Suitable solvents of this type include ether type alcohols, such as, for example, ethylene glycol monobutyl ether, ethylene glycol monoethyl ether, diethylene glycol monoethyl ether, glycol monomethyl ether, dipropylene glycol monomethyl ether, and the like; and lower alkanols having 2 to 4 carbon atoms such as ethanol, propanol, isopropanol, butanol, and the like, or mixtures of these solvents. Mixtures of the above water-soluble or water-miscible organic solvents and water can also be advantageously used as the solvent medium in the polymerization reaction.

In the polymerization of the monomers, the polymerization temperature employed can vary considerably, depending on the specific monomers employed, the use of catalysts and other conditions. Usually a vinyl polymerization catalyst is used, the preferred catalysts being azo compounds such as, for example, alpha, alpha'-azobisisobutyronitrile and peroxides such as benzoyl peroxide, cumene hydroperoxide and tertiary butyl perbenzoate. The quantity of catalyst employed may be varied considerably, however, in most instances it is desirable to utilize from about 0.1 to about 3.0 percent by weight based on monomer solids.

If interpolymers of relatively low molecular weight are desired, a chain-modifying agent or chain transfer agent is ordinarily added to the polymerization mixture. The mercaptans, such as dodecyl mercaptan, tertiary dodecyl mercaptan, octyl mercaptan, hexyl mercaptan, and the like, are conventionally used for this purpose. In addition, mercapto-esters, such as isooctyl thioglycolate can advantageously be used. Other chain transfer agents which may be employed in some instances include cyclopentadiene, allyl carbamate, alpha-methyl styrene, alpha-methyl styrene dimers and the like.

The iminated interpolymers are prepared by reacting the addition interpolymer containing carboxyl groups with an alkylenimine in sufficient amount to iminate a portion of the carboxyl groups, thereby producing a product containing carboxyl groups and pendent amine groups. The amount of alkylenimine employed in the imination reaction can be varied considerably, depending on the desired properties and the proportion of acid monomer moieties in the addition interpolymer. In general, an amount of alkylenimine sufficient to iminate from about 5 mole percent to about 95 mole percent of the carboxylic acid groups of the interpolymer may be employed. However, it is preferred in this invention to iminate at least about 15 mole percent of the carboxylic acid groups and usually not more than about 50 mole percent is iminated.

Alkylenimines (which term includes substituted alkylenimines) which may be employed in the imination reaction include imines such as those of the formula:

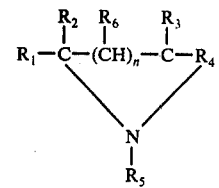

where $R_1$, $R_2$, $R_3$, $R_4$ and $R_5$ are each hydrogen; alkyl, such as methyl, ethyl, propyl, or the like, having, for example, up to about 20 carbon atoms; aryl such as phenyl or the like; alkaryl, such as tolyl, xylyl or the like; or aralkyl, such as benzyl, phenethyl, or the like. $R_6$ in the formula above is hydrogen or a lower alkyl radical, usually having not more than about 6 carbon atoms and $n$ is an integer from 0 to 1, preferably 0. Substituted radicals of the classes indicated are included where the substituent groups do not adversely affect the basic nature of the imine in the reaction. Such substituents may include groups such as cyano, halo, amino, hydroxy, alkoxy and carbalkoxy. The substituted groups may thus be cyanoalkyl, haloalkyl, aminoalkyl, hydroxyalkyl, alkoxyalkyl, carbalkoxyalkyl and similar substituted derivatives of aryl, alkaryl and aralkyl groups where present.

It will be recognized by those skilled in the art that compounds containing certain combinations of the above groups cannot be obtained, for example, because of factors such as steric hindrance or intra-molecular interaction. For this reason, in most of the compounds of the class described, several of the groups designated by $R_1$ through $R_6$ represent hydrogen. However, the efficacy of the various alkylenimines (whether or not within the above formula) does not depend upon the particular nature of any of the substituents, but rather the imine linkage.

Illustrative examples of suitable alkylenimines (i.e., aziridines) falling within the scope of the above formula include ethylenimine (aziridine), 1,2-propylenimine (2-methyl aziridine), 1,3-propylenimine (azetidine), 1,2-dodecylenimine (2-decyl aziridine), 1,1-dimethyl ethylenimine (2,2-dimethyl aziridine), phenyl ethylenimine (2-phenyl aziridine), tolyl ethylenimine [2-(4-methylphenyl)aziridine], benzyl ethylenimine (2-phenylmethyl aziridine), 1,2-diphenyl ethylenimine (2,3-diphenyl aziridine), hydroxyethyl ethylenimine [2-(2-hydroxyethyl)aziridine], aminoethyl ethylenimine [2-(2-aminoethyl)aziridine], 2-methyl propylenimine (2-methyl azetidine), 3-chloropropyl ethylenimine [2-(3-chloropropyl)aziridine], p-chlorophenyl ethylenimine [2-(4-chlorophenyl)aziridine], methoxyethyl ethylenimine [2-(2-methoxyethyl)aziridine], dodecyl aziridinyl formate (dodecyl 1-aziridinyl carboxylate), N-ethyl ethylenimine (1-ethyl aziridine), N-butyl ethylenimine (1-butyl aziridine), N-(2- hydroxyethyl)ethylenimine [1-(2-hydroxyethyl)aziridine] and the like.

Because of their availability and because they have been found to be among the most effective, the preferred imines are alkylenimines having 2 to 4 carbon atoms, and especially ethylenimine, 1,2-propylenimine and N-hydroxyethyl ethylenimine.

The salt of the addition interpolymers herein is obtained by neutralizing at least a portion of the carboxyl groups of the addition interpolymer with a sufficient amount of a basic compound to produce an addition interpolymer salt having after reaction with the desired amount of alkylenimine, the desired level of neutralization. The amount of base employed for that purpose may vary considerably, depending upon factors such as the amount of acid included in the interpolymer, the type of base utilized, the identity and amount of alkylenimine used, and so forth. The reaction with the base is usually carried out after imination but may be partly or wholly carried out prior to imination or simultaneously therewith.

Various basic compounds may be employed in the neutralization procedure, including inorganic bases such as the alkali metal hydroxides and organic bases such as ammonia or amines. Thus, alkali metal hydroxides such as potassium hydroxide, sodium hydroxide and the like may be employed. In general, the amines employed in the neutralization procedure may be any of the amines used for solubilizing resin systems known heretofore, including ethylamine, butylamine, dimethylamine, cyclohexylamine, morpholine, monoethanolamine, diethanolamine, dimethylethanolamine, diethylethanolamine, and the like.

While any of the aforementioned basic compounds can be employed in forming the pendent salt groups of the interpolymer, it is pointed out in copending application Ser. No. 771,276, filed on even date herewith, that the preferred basic compounds in certain instances are sterically-hindered tertiary amines having the structure:

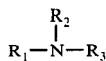

wherein $R_1$, $R_2$ and $R_3$ are each aliphatic or cycloaliphatic radicals having from 2 to 10 carbon atoms. Alkali metal hydroxides are also sometimes particularly useful.

The proportions of polyepoxide and addition interpolymer salt included in two-package compositions of the invention may vary considerably, depending on desired properties of the final cured product intended to be formed therefrom. In general, from about 5 to about 95 percent by weight of the addition interpolymer salt, based upon the combined weight solids of the addition interpolymer salt and polyepoxide may be employed with a preferred amount being from about 25 to about 75 percent by weight.

In addition to the polyepoxide and the addition interpolymer salt, the compositions of the invention may contain (as non-essential components) various other additives, including pigments and dyes of the type ordinarily utilized, fillers, plasticizers, anti-oxidants, flow control agents, surfactants, thickeners and other such formulating additives.

The compositions of the invention may be employed in various applications but are especially useful in coating applications requiring a high level of stain and solvent resistance. Thus, for example, the compositions herein are especially useful as coatings for hospital walls, operating rooms and the like.

The compositions herein can be applied by any conventional method, including brushing, rolling, dipping, flow coating, roll coatings, spraying and the like. Conventional spray techniques and equipment can be utilized.

The polymeric compositions of the invention may be cured by baking at moderate or elevated temperatures, if desired. However, one especially advantageous property of the curable compositions is that they can be cured by permitting them to dry (i.e., the solvent to evaporate) in air at ambient temperature without the use of heat, whereupon they inter-react to form a crosslinked product. As will be evident, ambient temperature curable compositions are of considerable advantage in that they provide for significant energy savings in comparison to compositions which require elevated temperature for curing.

The following examples are submitted for the purpose of further illustrating the nature of the present invention and should not be construed as a limitation on the scope thereof. All parts and percentages in the examples and throughout the specification are by weight unless otherwise indicated.

EXAMPLE 1

(a) Preparation of the Amino-Acrylic Interpolymer Package

The amino-acrylic addition interpolymer component of the package was prepared as follows:

Into a reactor equipped with a stirrer, thermometer, nitrogen inlet, dropping funnel and a condenser fitted with a water trap was charged 800 grams of ethylene glycol monoethyl ether (hereinafter ethyl Cellosolve). The contents of the reactor were heated to reflux and then a mixture consisting of 156.9 grams of styrene, 235.0 grams of methyl methacrylate, 156.9 grams of ethyl acrylate, 235.4 grams of methacrylic acid, 15.7 grams of tertiary dodecyl mercaptan, 100.0 grams of ethyl Cellosolve and 12.0 grams of benzoyl peroxide was charged to the reactor over a period of approximately 2.5 hours. (Based on monomer solids, the monomer charge consisted of 20 percent styrene, 30 percent methyl methacrylate, 20 percent ethyl acrylate, and 30 percent methacrylic acid.) The reaction mixture was then held for one hour at reflux. Following the hold period, 3 grams of benzoyl peroxide and 100 grams of ethyl Cellosolve were added to the reactor over a period of about 30 minutes and the reaction mixture then held for one hour at reflux. The reaction mixture was then cooled to about 25° C. and 93.9 grams of propylenimine were added to the reactor.

An exotherm was noted during the addition of propylenimine and the temperature was held at between 45°–55° C. with cooling. After the addition of propylenimine was completed, the reaction mixture was held for one hour at 55°–60° C. Following this hold period, 90.8 grams of dimethyl ethanolamine were added to the reactor and the temperature held at 50°–55° C. for about 30 minutes.

The resultant addition interpolymer solution had the following properties:

| | |
|---|---|
| Solids content at 150° C. | 47.0 percent |
| Gardner-Holdt viscosity | Z7 |
| Gardner color | 2+ |
| Amine equivalent weight (based on propylenimine) | 1213.8 |

The finished amino-acrylic interpolymer package was then prepared by admixing the following ingredients utilizing conventional paint mixing techniques:

| | Parts by Weight |
|---|---|
| Aminoe-acrylic interpolymer above | 300.0 |
| TiO$_2$ | 125.0 |
| Triton X-45 (non-ionic surfactant)* | 10.0 |
| Strodex SEK-50 (anionic surfactant)** | 10.0 |

-continued

| | Parts by Weight |
|---|---|
| Propylene glycol | 25.0 |
| Ethyl Cellosolve | 40.0 |
| Water | 5.0 |

*A non-ionic surfactant consisting of an ethoxylated alkyl phenol prepared from about 4.5 moles of ethylene oxide, available from Rohm & Haas Company.
**A potassium salt of an alkyl phosphate ester available from Dexter Chemical Company.

(b) Preparation of the Polyepoxide Package

A pigmented polyepoxide emulsion was prepared by admixing the following ingredients utilizing conventional emulsion preparation and paint mixing techniques:

| | Parts by Weight |
|---|---|
| Epon 828* | 40.0 |
| Epon 834**(90% solution in xylene) | 260.0 |
| $TiO_2$ | 250.0 |
| Magnesium silicate | 75.0 |
| Igepal CO897 (non-ionic surfactant)[1] | 35.0 |
| Triton X-100 (non-ionic surfactant)[2] | 10.0 |
| Atlas G3300 (anionic surfactant)[3] | 5.0 |
| Nopco NDW (anti-foaming agent)[4] | 4.0 |
| Strodex SEK-50 (anionic surfactant)[5] | 2.0 |
| Water | 429.5 |

*An epoxy resin of epichlorohydrin-Bisphenol A having an epoxide equivalent of 185-192 and a viscosity as measured by ASTM D-445 of 100-160 poises, available from Shell Chemical Company.
**An epoxy resin of epichlorohydrin-Bisphenol A having an epoxide equivalent of 230-280 and a Gardner-Holdt viscosity of O-V, available from Shell Chemical Company.
[1]A non-ionic surfactant consisting of an ethoxylated alkyl phenol prepared from about 30 moles of ethylene oxide, available from GAF Corporation.
[2]A non-ionic surfactant consisting of an ethoxylated alkyl phenol prepared from about 9.5-10 moles of ethylene oxide, available from Rohm and Haas Company.
[3]An anionic surfactant available from Atlas Chemical Company.
[4]An anti-foaming agent available from Nopco Division, Diamond Shamrock.
[5]An anionic surfactant consisting of a potassium salt of an alkyl phosphate ester available from Dexter Chemical Company.

A polymeric coating composition was prepared by blending the above amino-acrylate and polyepoxide packates 1:1 on a volume basis. The resulting polymeric coating composition was drawn down on duplicate metal panels using a 3-mil Bird Bar. The coated panels were then cured by permitting the panels to air dry at ambient temperature for 8 hours and then placing the panels in a 140° F. oven for an additional 16 hours.

The cure and solvent resistance of the coating was then evaluated utilizing a standard solvent resistance test in which the cloth impregnated with an organic solvent is rubbed across the surface of the film and the number of rubs passed before the film is removed from the substrate is reported. The coating of this example passed over 200 acetone double rubs in one test and over 300 ethanol double rubs in another test without film loss or softening indicating excellent cure and solvent resistance.

The stain resistance of a coating formed from the polymeric composition of this example was evaluated using a conventional stain resistance test employed in the coating industry. In this example, the resistance of the coating to staining from merthiolate was evaluated by applying a line of merthiolate across the top of a panel in which the coating was cured as indicated above. The panel containing the applied merthiolate was permitted to age for 16 hours and then an attempt was made to remove the applied line of merthiolate was permitted to age for 16 hours and then an attempt was made to remove the applied line of merthiolate with solvents such as soap and water, Mr. Clean and mineral spirits. The line of merthiolate was readily removed with any of the above solvents, indicating that the cured coating of this example has excellent resistance to staining by merthiolate.

EXAMPLE 2

(a) Preparation of the Amino-Acrylic Interpolymer Package

An amino-acrylic interpolymer package was prepared by mixing the following ingredients, utilizing the procedure of Example 1:

| | Parts by Weight |
|---|---|
| Amino-acrylic interpolymer of Ex. 1 | 300.0 |
| $TiO_2$ | 125.0 |
| Triton X-45 (non-ionic surfacant) | 10.0 |
| Potassium tripolyphosphate (50% solution in water | 10.0 |
| Propylene glycol | 25.0 |
| Ethyl Cellosolve | 40.0 |
| Water | 5.0 |

(b) Preparation of the Polyepoxide Package

In this example, the pigmented polyepoxide emulsion of Example 1 was utilized as the polyepoxide package.

A polymeric coating composition was prepared by blending the above amino-acrylic interpolymer and polyepoxide packages 1:1 on a volume basis as in Example 1. The resulting polymeric coating composition was applied to metal panels, cured and evaluated for solvent and stain resistance as in Example 1.

The cured coating passed over 200 acetone double rubs and over 200 ethanol double rubs, indicating excellent cure and solvent resistance. In addition, cured coatings formed from the composition of this example exhibited excellent resistance to merthiolate staining.

EXAMPLE 3

(a) Preparation of the Amino-Acrylic Interpolymer Package

An amino-acrylic interpolymer package was prepared by admixing the following ingredients, utilizing the procedure of Example 1:

| | Parts by Weight |
|---|---|
| Amino-acrylic interpolymer of Ex. 1 | 300.0 |
| $TiO_2$ | 125.0 |
| Triton X-45 (non-ionic surfactant) | 10.0 |
| Tamol 731 (anionic surfactant)* | 10.0 |
| Propylene glycol | 25.0 |
| Ethyl Cellosolve | 40.0 |
| Water | 5.0 |

*An anionic surfactant consisting of the sodium salt of a polycarboxylic acid, available from Rohm and Haas Co.

(b) Preparation of the Polyepoxide Package

In this example, the pigmented polyepoxide emulsion of Example 1 was utilized as the polyepoxide package.

A polymeric coating composition was prepared by blending the above amino-acrylic interpolymer and polyepoxide packages 1:1 on a volume basis as in Example 1. The resulting polymeric coating composition was applied to metal panels, cured and evaluated for solvent and stain resistance, as in Example 1.

The cured coating passed over 200 acetone double rubs and over 200 ethanol double rubs, indicating excellent cure and solvent resistance. In addition, cured coatings formed from the composition of this example exhibited excellent resistance to merthiolate staining.

EXAMPLE 4

(a) Preparation of the Amino-Acrylic Interpolymer Package

An amino-acrylic interpolymer package was prepared by admixing the following ingredients, utilizing the procedure of Example 1:

|  | Parts by Weight |
| --- | --- |
| Amino-acrylic interpolymer of Ex. 1 | 300.0 |
| TiO$_2$ | 125.0 |
| Igepal CO 897 (non-ionic surfactant) | 3.0 |
| Triton X-100 (non-ionic surfactant) | 2.0 |
| Propylene glycol | 25.0 |
| Ethyl Cellosolve | 40.0 |
| Water | 5.0 |

(b) Preparation of the Polyepoxide Package

In this example, the pigmented polyepoxide emulsion of Example 1 was utilized as the polyepoxide package.

A polymeric coating composition was prepared by blending the above amino-acrylic interpolymer and polyepoxide packages 1:1 on a volume basis as in Example 1. The resulting polymeric coating composition was applied to metal panels, cured and evaluated for solvent and stain resistance as in Example 1.

The cured coating passed over 200 acetone double rubs and over 200 ethanol double rubs, indicating excellent cure and solvent resistance. In addition, cured coatings formed from the composition of this example exhibited excellent resistance to merthiolate staining.

EXAMPLE 5

(a) Preparation of the Amino-Acrylic Addition Interpolymer Package

The amino-acrylic addition interpolymer component of the package was prepared as follows:

Into a reactor equipped with a stirrer, thermometer, nitrogen inlet, dropping funnel and a condenser fitted with a water trap was charged 896.0 grams of ethyl Cellosolve. The contents of the reactor were heated to 133° C. and a mixture consisting of 267.8 grams of styrene, 232.2 grams of methacrylic acid, 250.0 grams of butyl acrylate, 250.0 grams of 2-ethylhexyl acrylate, 179.3 grams of ethyl Cellosolve, and 32.0 grams of tertiary butyl peracetate was added over a 2 hour period. (Based on monomer solids, the monomer charge consisted of 26.8 percent styrene, 23.2 percent methacrylic acid, 25.0 percent butyl acrylate and 25.0 percent 2-ethylhexyl acrylate). Following this addition, 8.0 grams of tertiary butyl peracetate and 44.8 grams of ethyl Cellosolve were added to the reactor over a 35 minute period. Then the contents of the reactor were cooled to about 33° C. and 71.8 grams of propylenimine were added to the reaction mixture. After the propylenimine addition was completed, 85.7 grams of potassium hydroxide was added to the reaction mixture, following which 100.0 grams of water were added.

The resultant addition interpolymer solution had the following properties:
Solids content at 150° C.: 47.8 percent
Gardner-Holdt viscosity: U-V
Amine equivalent weight: 1919

The finished amino-acrylic interpolymer package was then prepared by admixing the following ingredients utilizing conventional paint mixing techniques:

|  | Parts by Weight |
| --- | --- |
| Amino-acrylic interpolymer above | 300.0 |
| TiO$_2$ | 125.0 |
| Igepal CO 897 (non-ionic surfactant) | 5.0 |
| Triton X-100 (non-ionic surfactant) | 2.0 |
| Strodex SEK 50 (anionic surfactant) | 5.0 |
| Propylene glycol | 25.0 |
| Ethyl cellosolve | 30.0 |
| Water | 20.0 |

(b) Preparation of the Polyepoxide Package

In this example, the pigmented polyepoxide emulsion of Example 1 was utilized as the polyepoxide package.

A polymeric coating composition was prepared by blending the above amino-acrylic interpolymer and polyepoxide packages 1:1 on a volume basis as in Example 1. The resulting polymeric coating composition was applied to metal panels, cured and evaluated for solvent and stain resistance as in Example 1.

The cured coating passed over 200 acetone double rubs and over 200 ethanol double rubs, indicating excellent cure and solvent resistance. In addition, cured coatings formed from the composition of this example exhibited excellent resistance to merthiolate staining.

EXAMPLE 6

(a) Preparation of the Amino-Acrylic Addition Interpolymer Package

In this example, the amino-acrylic addition interpolymer package of Example 5 was utilized.

(b) Preparation of the Polyepoxide Package

In preparing the polyepoxide package, a polyepoxide adduct was first prepared in the following manner:

To a 5 liter flask equipped with heating means, thermometer, and stirrer were charged 380.0 grams of Epon 828, 200.0 grams of Carbowax 400 (a waxy polyethylene glycol having a molecular weight of 400, a specific gravity of 1.1281 and a melting point of 4° to 8° C., and 2.9 grams of SnCl$_2$. The mixture was heated to 180° C. and held at room temperature until a sample of the reaction product thinned with butyl Cellosolve to a ratio of 75 percent reaction product and 25 percent butyl Cellosolve attained a Gardner-Holdt viscosity of J-K. The resultant polyepoxide adduct had an epoxide equivalent of 567 and, after aging over night, a Gardner-Holdt viscosity of R.

The finished polyepoxide package was then prepared by admixing the following ingredients utilizing conventional paint mixing techniques:

|  | Parts by Weight |
| --- | --- |
| Polyepoxide adduct above | 283.0 |
| Triton X-100 (non-ionic surfactant) | 4.0 |
| Nopco NDW (antifoaming agent) | 4.0 |
| Strodex SEK-50 (anionic surfactant) | 2.0 |
| Water | 152.0 |

A polymeric coating composition was prepared by blending the above amino-acrylic interpolymer and polyepoxide packages 1:1 on a volume basis. The resultant polymeric coating composition was applied to metal panels, cured and evaluated for solvent and stain resistance as in Example 1.

The cured coating passed over 200 acetone double rubs and over 200 ethanol double rubs, indicating excellent cure and solvent resistance. Cured coatings formed from the composition of this example exhibited decreased resistance to staining. However, other evaluations in which the polyepoxide package ofthe composition consisted of blends of polyepoxides such as Epon 828 or Epon 834 with minor amounts of polyepoxide adducts of the above type showed much less decrease in stain resistance.

According to the provisions of the Patent Statutes, there are described above the invention and what are now believed to be its best embodiments. However, within the scope of the appended claims, it is to be understood that the invention can be practiced otherwise than as specifically described.

We claim:

1. A two-package polymeric composition, the film-forming vehicle components of which consists essentially of:
   (a) a polyepoxide having a 1,2-epoxy equivalent of greater than 1.0 and a molecular weight below about 4,000; and
   (b) an addition interpolymer formed from at least one polymerizable ethylenically unsaturated carboxylic acid monomer with one or more other polymerizable ethylenically unsaturated monomers wherein the unsaturated carboxylic acid monomer comprises about 5 percent to about 60 percent of the addition interpolymer, and pendent thereto:
      (1) anionic salt groups formed by reacting said carboxyl groups with a sufficient amount of a base to give the interpolymer a pH of greater than about 6 in an aqueous medium; and
      (2) amine groups formed by reacting from about 5 mole percent to about 95 mole percent of said carboxyl groups with an alkylenimine;

said components (a) and (b) being interractive to form a crosslinked, hard and solvent- and stain-resistant material.

2. The polymeric composition of claim 1 in which said composition is water-reducible.

3. The polymeric composition of claim 1 in which either or both of said components (a) and (b) are in a solvent medium composed predominantly of water.

4. The polymeric composition of claim 3 in which any organic solvents present are water-miscible or water-reducible.

5. The polymeric composition of claim 1 in which said addition interpolymer has a pH greater than 7.0 in aqueous medium.

6. The polymeric composition of claim 1 wherein said addition interpolymer is formed from a polymerizable, alpha, beta-ethylenically unsaturated carboxylic acid and one or more other polymerizable ethylenically unsaturated monomers.

7. The polymeric composition of claim 6 wherein said carboxylic acid is acrylic acid or methacrylic acid, or a mixture thereof.

8. The polymeric composition of claim 6 wherein said carboxylic acid comprises about 10 to about 50 percent by weight of said carboxylic acid and said other monomers.

9. The polymeric composition of claim 8 wherein said alkylenimine is reacted with at least about 15 mole percent of said carboxyl groups.

10. The polymeric composition of claim 9 wherein said alkylenimine is propylenimine or ethylenimine or a mixture thereof.

11. The polymeric composition of claim 9 wherein said polyepoxide resin is a polyglycidyl ether of a polyphenol.

12. The polymeric composition of claim 11 wherein said polyphenol is bisphenol A.

13. The polymeric composition of claim 1 wherein said vehicle components consist essentially of from about 5 to about 95 weight percent of said polyepoxide and from about 95 to about 5 weight percent of said addition interpolymer.

* * * * *